(12) United States Patent
Qu (10) Patent No.: US 9,684,692 B2
(45) Date of Patent: Jun. 20, 2017

(54) DATA DISTRIBUTING METHOD AND MANAGEMENT NODE

(71) Applicant: ZTE Corporation, Shenzhen, Guangdong (CN)

(72) Inventor: Wenwu Qu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/429,036

(22) PCT Filed: Aug. 9, 2013

(86) PCT No.: PCT/CN2013/081203
§ 371 (c)(1),
(2) Date: Mar. 18, 2015

(87) PCT Pub. No.: WO2014/044092
PCT Pub. Date: Mar. 27, 2014

(65) Prior Publication Data
US 2015/0254304 A1 Sep. 10, 2015

(30) Foreign Application Priority Data
Sep. 20, 2012 (CN) .......................... 2012 1 0351902

(51) Int. Cl.
*G06F 17/30* (2006.01)

(52) U.S. Cl.
CPC ........ *G06F 17/30466* (2013.01); *G06F 17/30* (2013.01); *G06F 17/30339* (2013.01);
(Continued)

(58) Field of Classification Search
None
See application file for complete search history.

(56) References Cited

U.S. PATENT DOCUMENTS

2004/0117379 A1 6/2004 Khatchatrian
2007/0276788 A1* 11/2007 Cohen ............... G06F 17/30498
(Continued)

FOREIGN PATENT DOCUMENTS

| CN | 102063486 A | 5/2011 |
|----|-------------|--------|
| CN | 102446208 A | 5/2012 |
| JP | 2011053861 A | 3/2011 |

OTHER PUBLICATIONS

International Search Report in international application No. PCT/CN2013/081203, mailed on Oct. 31, 2013.
(Continued)

*Primary Examiner* — Belix M Ortiz Ditren
(74) *Attorney, Agent, or Firm* — Oppedahl Patent Law Firm LLC (57) ABSTRACT

A data distributing method and a management node are provided, which include: according to a received request for cross join, acquiring the number of sub-tables, serial numbers of sub-tables, the number of nodes and serial numbers of nodes, wherein the sub-tables and the nodes are separately included in table A and table B which need to perform cross join; setting the serial numbers of the sub-tables included in the table A or the table B in abscissa or ordinate in sequence, to form length or width of a big rectangle separately to generate the big rectangle; dividing the big rectangle into two sub-rectangles according to a construction method, wherein the two sub-rectangles are respectively the first sub-rectangle and the second sub-rectangle; evenly dividing the first sub-rectangle and the second sub-rectangle separately to form several small rectangles, wherein each small rectangle corresponds to a serial number of a computing node and corresponds to a serial number of a sub-table; distributing the sub-table corresponding to each small rectangle to the computing node corresponding to each small (Continued)

rectangle. Thus, the amount of data transmitted can be decreased, and the network transmission load is lightened.

6 Claims, 3 Drawing Sheets

(52) U.S. Cl.
CPC .. *G06F 17/30498* (2013.01); *G06F 17/30545* (2013.01); *G06F 17/30584* (2013.01)

(56) References Cited

U.S. PATENT DOCUMENTS

| 2009/0024658 A1 | 1/2009 | Khatchatrian |
| 2010/0057672 A1 | 3/2010 | Zhou |
| 2010/0306212 A1 | 12/2010 | Tsirogiannis |

OTHER PUBLICATIONS

English Translation of the Written Opinion of the International Search Authority in international application No. PCT/CN2013/081203, mailed on Oct. 31, 2013.
Supplementary European Search Report in European application No. 13838776.6, mailed on Aug. 31, 2015.
Genetic algorithm for query optimization in parallel database,Master of the full text database (MA) information technology series of Chinese excellent master's degree thesis ,Phase 1;Ping Xuan,mailed on Mar. 15, 2005.

* cited by examiner

DATA DISTRIBUTING METHOD AND MANAGEMENT NODE

TECHNICAL FIELD

The disclosure relates to the technical field of distributed data management, and in particular to a data distributing method and a management node.

BACKGROUND

Generally, it may take several hours or more time to process hundreds of Gigabits (GB) of data, e.g. log file, when using a common computer, while it may take hundreds of hours to process dozens of Terabits (TB) of data, which is too long. People adopt a data distributing method to solve the problem; the data distribution includes that a set of all data is called table, a set of a part of all data is called sub-table, a table may include a number of sub-tables, and a number of sub-tables are distributed to a number of computing nodes, e.g. 100 computing nodes; each computing node is only for computation of a part of all data. Thus, these computing nodes can compute simultaneously, which can reduce the processing time greatly.

Figure 5:
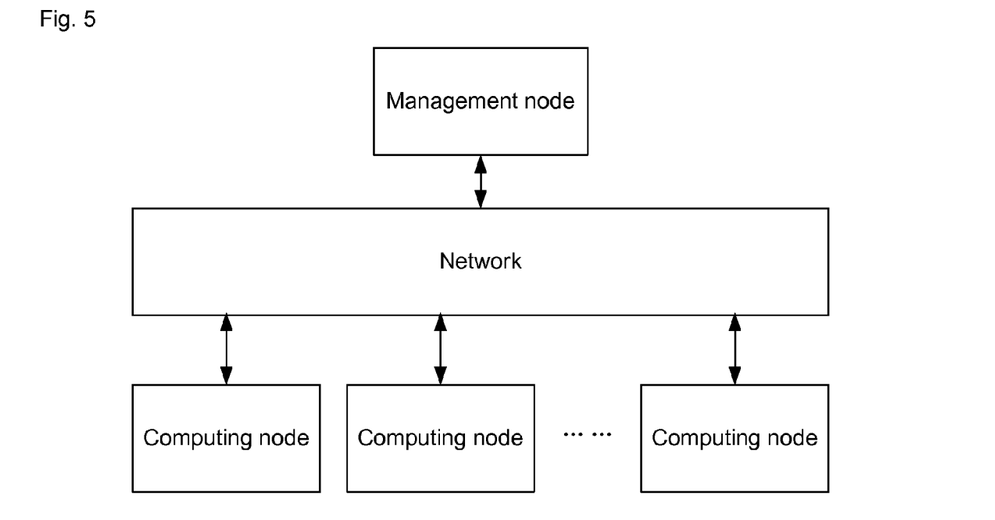
FIG. 5 is a structural diagram of a data distributing system.

A data distributing system usually includes a management node and a number of computing nodes; as shown in FIG. 5, the management node and the computing nodes are interconnected through a network. The management node is responsible for distribution of data, scheduling of computing tasks and so on; the management node is always coincident with a data storage management node and a cluster management node physically, wherein the data management node records the number of sub-tables of a table, the location of sub-tables and other information, and the cluster management node records the addresses of nodes, memory size, CPU capability and other information. The computing node is responsible for storing sub-tables in a local hard disk or memory, executing a task assigned by the management node, and saving an execution result in the local hard disk or memory. The management node and the computing node can be either a computer or a processor.

For example, {names of all Chinese people} is a table which includes 1.6 billon names; since the data amount of the table is too large, it is needed to divide the table into some sub-tables, the total number of names in each sub-table is not more than 10 thousand. In this way, sub-tables {{people surnamed Zhang 1}, {people surnamed Zhang 2}, . . . {people surnamed Qian 1}, . . . } are formed, a table includes 160 thousand sub-tables. These sub-tables are distributed to 1000 computing nodes; the first 160 sub-tables may be stored at the first computing node, and so on. This process is data distribution. Placing a sub-table on a computing node needs to be completed through network transmission; if a computing node stores 160 sub-tables, and then, it is needed to transmit a data amount of 160 sub-tables to this computing node; the larger the data amount is, the heavier the burden of network transmission is.

Cross join is a standard operation command between two tables, and its function is similar to the multiplication in daily arithmetic, but the cross join is a product (Cartesian product) of two tables. For example, table 1 is (5, 4), table 2 is (3, 2, 6), that is, the table 1 includes two elements, namely 5 and 4, and the table 2 includes three elements, namely 3, 2 and 6. In daily arithmetic, 5×5=25, but the result of (5, 4) cross join (3, 2, 6) may be (5×3, 4×3, 5×2, 4×2, 5×6, 4×6)=(15, 12, 10, 8, 30, 24), or (5+3, 4+3, 5+2, 4+2, 5+6, 4+6)=(8, 7, 7, 6, 11, 10). All results obtained from these examples form a table, and each of the obtained tables includes 2×3=6 elements.

Suppose that there are two computing nodes, namely computing node N1 and computing node N2; if the elements in the table 1 and the table 2 are taken as sub-tables, then the sub-tables {5}, {3}, {2} are distributed on N1, and the sub-tables {4}, {6} are distributed on N2. When it is needed to perform cross join computation between two tables, namely ({5}, {4}) cross join ({3}, {2}, {6}), the following problem will occur: completing the cross join computation needs to perform computation between {5} and {6}, computation between {4} and {3}, and computation between {4} and {2}, but the two sub-tables are at different computing nodes, so that computation cannot be performed. At present, for performing the cross join computation normally, each computing node is usually enabled to store all the sub-tables in one table, and the sub-tables in another table are evenly distributed on each computing node, for example, both N1 and N2 store {3}, {2}, {6}, N1 stores {5}, and N2 stores {4}; or, both N1 and N2 store {5} and {4}, N1 stores {3}, {2}, and N2 stores {6}; there are other data distributing modes. However, such existing data distributing mode will cause a very large data amount needed to be transmitted to the computing node, so the burden of network transmission is very heavy; especially when the more the computing nodes to which data are distributed are, and the closer the numbers of the sub-tables of two tables are, the more obvious the problem of large data amount is. Currently, there is no technology which can decrease the amount of data transmitted.

SUMMARY

In view of this, the disclosure is mainly intended to provide a data distributing method and a management node, which can decrease the amount of data transmitted, and lighten the network transmission load.

To this end, the technical solutions of the disclosure are implemented as follows.

The disclosure provides a data distributing method, which is applied to a node; the method may include:

according to a received request for cross join, acquiring the number of sub-tables, serial numbers of sub-tables, the number of nodes and serial numbers of nodes, wherein the sub-tables and the nodes are separately included in table A and table B which need to perform cross join;

setting the serial numbers of the sub-tables included in the table A or the table B in abscissa or ordinate in sequence, to form length or width of a big rectangle separately to generate the big rectangle;

dividing the big rectangle into two sub-rectangles according to a construction method, wherein the two sub-rectangles are respectively a first sub-rectangle and a second sub-rectangle;

evenly dividing the first sub-rectangle and the second sub-rectangle separately to form several small rectangles, wherein each small rectangle corresponds to a serial number of a computing node and corresponds to a serial number of a sub-table; and distributing the sub-table corresponding to each small rectangle to the computing node corresponding to each small rectangle.

In an embodiment, dividing the big rectangle into two sub-rectangles according to a construction method may include:

computing an ideal backup number Ma or Mb of subsets of the table A or the table B, wherein the subsets are distributed to all the computing nodes, wherein Ma represents an ideal backup number of subsets of the table A and Ma is obtained by the formula Ma=$\sqrt{Nn*Na/Nb}$, wherein Na, Nb and Nn are known, Na represents the number of sub-tables of the table A, Nb represents the number of sub-tables of the table B, and Nn represents the number of the computing nodes: Mb represents an ideal backup number of subsets of the table B and Mb is obtained in a similar way as Ma;

according to the Ma or Mb obtained by computing, obtaining an evenly division coefficient Xa1*Xb1 of the first sub-rectangle and an evenly division coefficient Xa2*Xb2 of the second sub-rectangle, wherein Xa1*Xb1 represents an evenly division coefficient of the first sub-rectangle, Xa2*Xb2 represents an evenly division coefficient of the second sub-rectangle, both Xa1*Xb1 and Xa2*Xb2 is obtained according to the Ma or Mb:

according to the obtained Xa1*Xb1 and Xa2*Xb2, computing to obtain a division point Pa of the length or width of the big rectangle; and dividing the big rectangle into two sub-rectangles according to the Pa obtained by computing.

In an embodiment, dividing the big rectangle into two sub-rectangles according to the Pa obtained by computing may include:

according to the Pa obtained by computing, dividing the big rectangle into two sub-rectangles at a side which is set with more serial numbers of sub-tables.

In an embodiment, evenly dividing the first sub-rectangle and the second sub-rectangle separately may include:

according to the obtained Xa1*Xb1 and Xa2*Xb2, evenly dividing the first sub-rectangle and the second sub-rectangle separately.

The disclosure also provides a management node; the management node may include:

an information acquiring unit, which is configured to, according to the received request for cross join, acquire the number of sub-tables, serial numbers of sub-tables, the number of nodes and serial numbers of nodes, wherein the sub-tables and the nodes are separately included in the table A and the table B which need to perform cross join;

a big rectangle generating unit, which is configured to set the serial numbers of the sub-tables included in the table A or the table B in abscissa or ordinate in sequence, to form length or width of a big rectangle separately to generate the big rectangle;

a big rectangle division unit, which is configured to divide the big rectangle into two sub-rectangles according to the construction method, wherein the two sub-rectangles are respectively a first sub-rectangle and a second sub-rectangle;

a sub-rectangle division unit, which is configured to evenly divide the first sub-rectangle and the second sub-rectangle separately to form several small rectangles, wherein each small rectangle corresponds to a computing node and corresponds to a serial number of a sub-table; and a distributing unit, which is configured to distribute the sub-table corresponding to each small rectangle to the computing node corresponding to each small rectangle.

In an embodiment, the big rectangle division unit may include:

an ideal backup number computing subunit, which is configured to compute an ideal backup number Ma or Mb of subsets of the table A or the table B, wherein the subsets are distributed to all the computing nodes;

an evenly division coefficient computing subunit, which is configured to, according to the Ma or Mb obtained by computing through the ideal backup number computing subunit, obtain an evenly division coefficient Xa1*Xb1 of the first sub-rectangle and an evenly division coefficient Xa2*Xb2 of the second sub-rectangle;

a division point computing subunit, which is configured to, according to the Xa1*Xb1 and the Xa2*Xb2 obtained by the evenly division coefficient computing subunit, compute to obtain the division point Pa of the length or width of the big rectangle; and a dividing subunit, which is configured to, according to the Pa obtained by computing through the division point computing subunit, divide the big rectangle into two sub-rectangles.

In an embodiment, the dividing subunit may be configured to, according to the Pa obtained by computing through the division point computing subunit, divide the big rectangle into two sub-rectangles at the side which is set with more serial numbers of sub-tables.

In an embodiment, the sub-rectangle division unit may be configured to, according to the Xa1*Xb1 and the Xa2*Xb2 obtained by the evenly division coefficient computing subunit, evenly divide the first sub-rectangle and the second sub-rectangle separately.

Given the above, the technical solutions of the disclosure include that the number of sub-tables, serial numbers of sub-tables, the number of nodes and serial numbers of nodes are acquired according to a received request for cross join, wherein the sub-tables and the nodes are separately included in table A and table B which need to perform cross join; the serial numbers of the sub-tables included in the table A or the table B are set in abscissa or ordinate in sequence to form length or width of a big rectangle separately to generate the big rectangle; the big rectangle are divided into two sub-rectangles according to the construction method, wherein the two sub-rectangles are respectively a first sub-rectangle and a second sub-rectangle; the first sub-rectangle and the second sub-rectangle are evenly divide separately to form several small rectangles, wherein each small rectangle corresponds to a serial number of a computing node and corresponds to a serial number of a sub-table; and the sub-table corresponding to each small rectangle are distributed to the computing node corresponding to each small rectangle; thus, the number of subsets which are distributed to the computing nodes can be decreased, and the amount of data transmitted is reduced.

DETAILED DESCRIPTION

Figure 1:
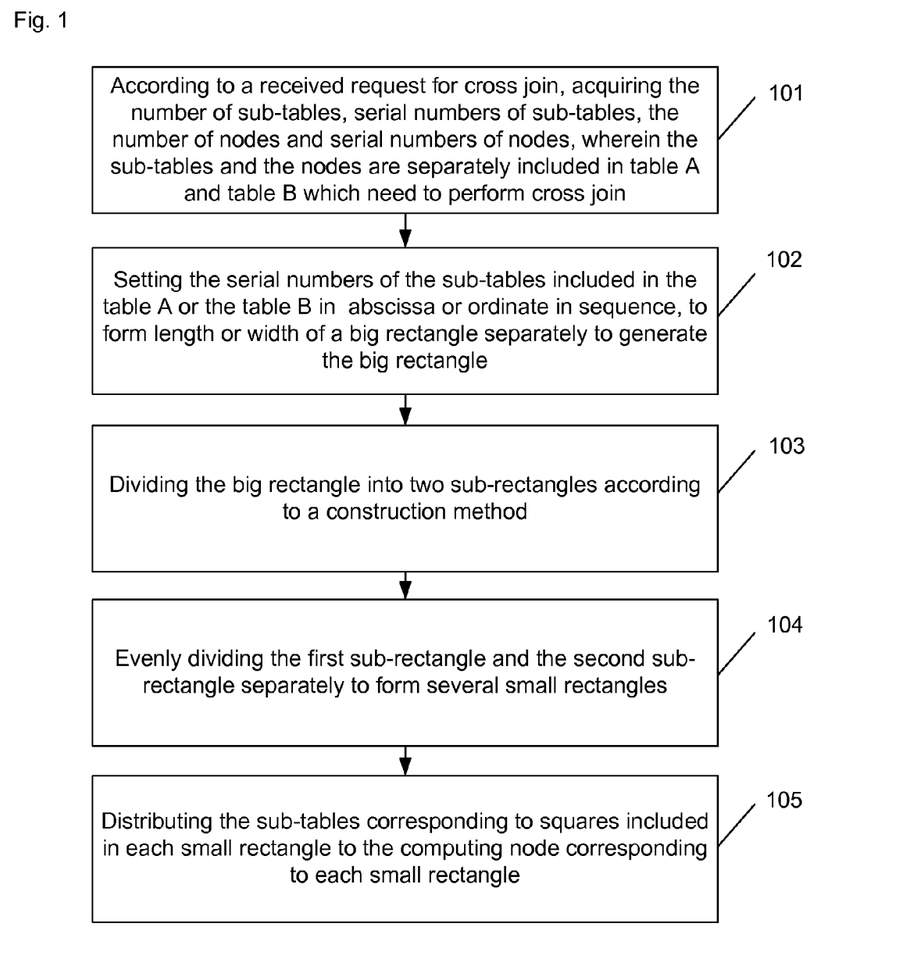
FIG. 1 is a flowchart of a first embodiment of a data distributing method provided by the disclosure.

A first embodiment of a data distributing method provided by the disclosure is as shown in FIG. 1, the method includes:

step 101: according to a received request for cross join, acquiring the number of sub-tables, serial numbers of sub-tables, the number of nodes and serial numbers of nodes, wherein the sub-tables and the nodes are separately included in table A and table B which need to perform cross join;

step 102: setting the serial numbers of the sub-tables included in the table A or the table B in abscissa or ordinate in sequence, to form length or width of a big rectangle separately to generate the big rectangle;

step 103: dividing the big rectangle into two sub-rectangles according to a construction method, wherein the two sub-rectangles are respectively the first sub-rectangle and the second sub-rectangle;

step 104: evenly dividing the first sub-rectangle and the second sub-rectangle separately to form several small rectangles, wherein each small rectangle corresponds to a serial number of a computing node, and corresponds to a serial number of a sub-table; and Step 105: distributing the sub-tables corresponding to squares included in each small rectangle to the computing node corresponding to each small rectangle.

In an embodiment, dividing the big rectangle into two sub-rectangles according to a construction method may include:

computing the ideal backup number Ma or Mb of sub-tables of the table A or the table B, wherein the sub-tables are distributed to all the computing nodes;

according to the Ma or Mb obtained by computing, obtaining the evenly division coefficient Xa1*Xb1 of the first sub-rectangle and the evenly division coefficient Xa2*Xb2 of the second sub-rectangle;

according to the obtained Xa1*Xb1 and Xa2*Xb2, computing to obtain the division point Pa of the length or width of the big rectangle; and dividing the big rectangle into two sub-rectangles according to the Pa obtained by computing.

In an embodiment, dividing the big rectangle into two sub-rectangles according to the Pa obtained by computing may include:

according to the Pa obtained by computing, dividing the big rectangle into two sub-rectangles at the side which is set with more serial numbers of sub-tables.

In an embodiment, evenly dividing the first sub-rectangle and the second sub-rectangle separately may include:

according to the obtained Xa1*Xb1 and Xa2*Xb2, evenly dividing the first sub-rectangle and the second sub-rectangle separately.

Figure 2:
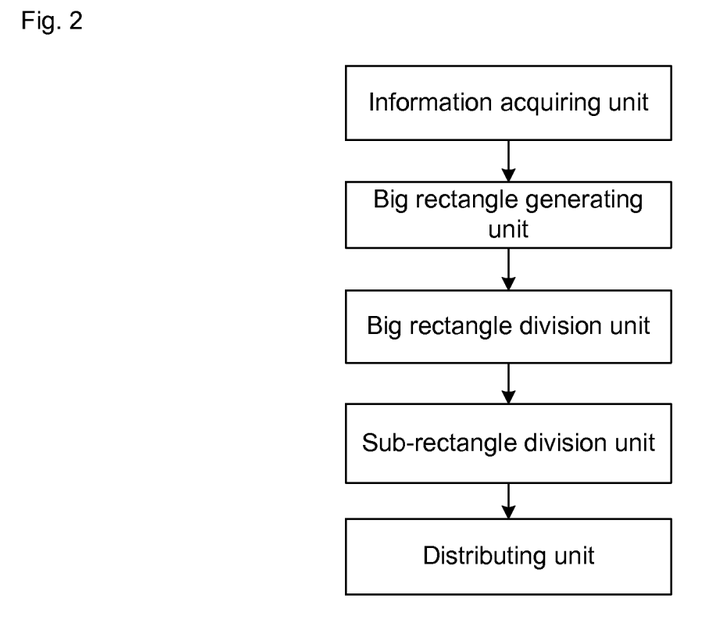
FIG. 2 is a structural diagram of an embodiment of a management node provided by the disclosure.

An embodiment of a management node provided by the disclosure is as shown in FIG. 2, the management node includes:

an information acquiring unit, which is configured to, according to a received request for cross join, acquire the number of sub-tables, serial numbers of sub-tables, the number of nodes and serial numbers of nodes, wherein the sub-tables and the nodes are separately included in the table A and the table B which need to perform cross join;

a big rectangle generating unit, which is configured to set the serial numbers of the sub-tables included in the table A or the table B in abscissa or ordinate in sequence, as length or width of a big rectangle separately to generate the big rectangle;

a big rectangle division unit, which is configured to divide the big rectangle into two sub-rectangles according to the construction method, wherein the two sub-rectangles are respectively the first sub-rectangle and the second sub-rectangle;

a sub-rectangle division unit, which is configured to evenly divide the first sub-rectangle and the second sub-rectangle separately to form several small rectangles, wherein each small rectangle corresponds to a serial number of a computing node, and corresponds to a serial number of a sub-table; and a distributing unit, which is configured to distribute the sub-tables corresponding to squares included in each small rectangle to the computing node corresponding to each small rectangle.

In an embodiment, the big rectangle division unit may include:

an ideal backup number computing subunit, which is configured to compute an ideal backup number Ma or Mb of subsets of the table A or the table B, wherein the subsets are distributed to all the computing nodes;

an evenly division coefficient computing subunit, which is configured to, according to the Ma or Mb obtained by computing through the ideal backup number computing subunit, obtain the evenly division coefficient Xa1*Xb1 of the first sub-rectangle and the evenly division coefficient Xa2*Xb2 of the second sub-rectangle;

a division point computing subunit, which is configured to, according to the Xa1*Xb1 and the Xa2*Xb2 obtained by the evenly division coefficient computing subunit, compute to obtain the division point Pa of the length or width of the big rectangle; and a dividing subunit, which is configured to, according to the Pa obtained by computing through the division point computing subunit, divide the big rectangle into two sub-rectangles.

In an embodiment, the dividing subunit is specifically configured to, according to the Pa obtained by computing through the division point computing subunit, divide the big rectangle into two sub-rectangles at the side set with more serial numbers of sub-tables.

In an embodiment, the sub-rectangle division unit is specifically configured to, according to the Xa1*Xb1 and the Xa2*Xb2 obtained by the evenly division coefficient computing subunit, evenly divide the first sub-rectangle and the second sub-rectangle separately.

A second embodiment of the data distributing method provided by the disclosure is introduced below in combination with FIG. 3; in this embodiment, the number Nn of the computing nodes is 3, the serial numbers of the computing nodes may be expressed as Node1, Node2 and Node3; two tables are expressed as table A and table B respectively; the number Na of sub-tables of the table A is 4, and the serial numbers of sub-tables of the table A may be expressed as A1, A2, A3 and A4; the number Nb of sub-tables of the table B is 4, and the serial numbers of sub-tables of the table B may be expressed as B1, B2, B3 and B4; the method may include the following steps.

Step 201 is that the management node acquires, according to a received request for cross join, the number of sub-tables, the serial numbers of sub-tables, the number of nodes and the serial numbers of nodes, wherein the sub-tables and the nodes are separately included in the table A and the table B which need to perform cross join.

Figure 3:
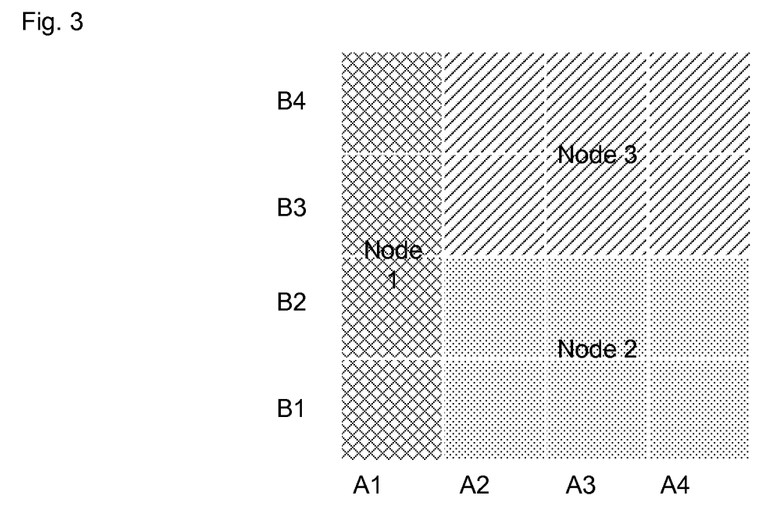
FIG. 3 is a sub-table distribution diagram of a second embodiment of a data distributing method provided by the disclosure.

Step 202 is that the serial numbers of the sub-tables included in the table A or the table B are set in abscissa or ordinate in sequence to form length or width of a big rectangle separately to generate the big rectangle composed of some squares; the number of the squares is a product of the numbers of the sub-tables separately included in the table A and the table B;

in this embodiment, as shown in FIG. 3, the serial numbers of the sub-tables included in the table A are set in the abscissa in sequence as the length, and the serial numbers of the sub-tables included in the table B are set in the ordinate in sequence as the width, so as to generate a big rectangle composed of 16 squares.

Step 203 is that the big rectangle is divided into two sub-rectangles according to the construction method, wherein the two sub-rectangles are respectively the first sub-rectangle and the second sub-rectangle;

specifically, this step may include the following steps:

step 2031: computing an ideal backup number Ma of subsets of the table A or the table B, wherein the subsets are distributed to all the computing nodes;

here, the total amount of computation of cross join needed to be completed is Na*Nb, and the partial amount of computation of cross join that a computing node can complete is (Ma*Na/Nn)*(Mb*Nb/Nn), and then the product of the partial amount of computation of cross join that a computing node can complete times the number of the computing nodes should be greater than or equal to the total amount of computation of cross join needing to be completed, namely, $$(Ma*Na/Nn)*(Mb*Nb/Nn)*Nn \geq Na*Nb, \quad (1)$$

it can be obtained from formula (1) that $Ma*Na*Mb*Nb \geq Nn*Na*Nb$, when the amount of data transmitted is small, $Ma*Na*Mb*Nb = Nn*Na*Nb$;

$Ma*Na + Mb*Nb$ is the amount of data transmitted, according to mathematical principles, $Ma*Na + Mb*Nb \geq 2\sqrt{Ma*Mb*Na*Nb}$, when $Ma*Na = Mb*Nb$, the amount of data transmitted is minimum, thus, $Ma = \sqrt{Nn*Na/Nb} = \sqrt{3*4/4} = 1.73$;

step 2032: according to the Ma obtained by computing, obtaining the evenly division coefficient Xa1*Xb1 of the first sub-rectangle and the evenly division coefficient Xa2*Xb2 of the second sub-rectangle;

specifically, according to an equation set:

$$Xa1*Xb1 + Xa2*Xb2 = Nn \quad (2)$$

$$Xa1 = \text{integer portion of } Ma \quad (3)$$

$$Xa2 = Xa1 + 1 \quad (4)$$

since the actual backup number of the sub-tables can be only integer, it is needed to perform integer adjustment to the Ma to obtain an integer; in this embodiment, it is obtained that Xa1=1, Xa2=2, Xb1=1, and Xb2=1, thus Xa1*Xb1 is 1, Xa2*Xb2 is 2. In practice, Xb1 and Xb2 may have multiple solutions separately, as long as a solution is selected from two groups of solutions separately;

step 2033: according to the obtained Xa1*Xb1 and Xa2*Xb2, computing to obtain a division point Pa of the length or width of the big rectangle, wherein the Pa means dividing the big rectangle at which square from left;

specifically, computing to obtain an ideal value of Pa according to formula (5), $$\text{the ideal value of } Pa = Na*(Xa1*Xb1)/(Xa1*Xb1 + Xa2*Xb2) \quad (5)$$

in this embodiment, the ideal value of Pa=4*(1)/(1+2)=1.3, when the ideal value of Pa is not an integer, the integer portion of the ideal value of Pa is taken to obtain the Pa, and the Pa is 1 in this embodiment;

step 2034: dividing the big rectangle into two sub-rectangles according to the Pa obtained by computing, wherein the two sub-rectangles are the first sub-rectangle and the second sub-rectangle;

in this embodiment, the big rectangle is divided into left and right sub-rectangles at the first square from left.

Step 204 is that according to the obtained Xa1*Xb1 and Xa2*Xb2, the first sub-rectangle and the second sub-rectangle are evenly divided separately;

in this embodiment, the first sub-rectangle is evenly divide according to 1*1, the abscissa of the first sub-rectangle is divided into 1 equal part, and the ordinate of the first sub-rectangle is divided into 1 equal part, namely the first sub-rectangle is not evenly divided; the second sub-rectangle is evenly divided according to 2*1, the abscissa of the second sub-rectangle is divided into 1 equal part, and the ordinate of the second sub-rectangle is divided into 2 equal parts, namely the second sub-rectangle is divided into upper and lower rectangles which are the same; the abscissa of the second sub-rectangle may also be divided into 2 equal parts, and the ordinate of the second sub-rectangle is divided into 1 equal part, namely the second sub-rectangle is divided into left and right rectangles which are the same.

Step 205 is that the sub-tables corresponding to the squares included in each small rectangle are distributed to the computing nodes corresponding to each small rectangle.

With reference to FIG. 3, the sub-table A1 of the table A and the sub-tables B1, B2, B3, B4 of the table B are distributed to the Node1; the sub-tables A2, A3, A4 of the table A and the sub-tables B1, B2 of the table B are distributed to the Node2; the sub-tables A2, A3, A4 of the table A and the sub-tables B3, B4 of the table B are distributed to the Node3; thus, the embodiment of the disclosure only needs to transmit the data amount of 15 sub-tables;

however, adopting the existing technology needs to distribute the sub-tables A1, A2, B1, B2, B3, B4 to the Node1, distribute the sub-tables A3, B1, B2, B3, B4 to the Node2, and distribute the sub-tables A4, B1, B2, B3, B4 to the Node3; that is, it is needed to transmit the data amount of 16 sub-tables; it can be known by comparison that the embodiment of the disclosure can decrease the amount of data transmitted.

A third embodiment of the data distributing method provided by the disclosure is introduced below in combination with FIG. 4; in this embodiment, the number Nn of the computing nodes is 5, the serial numbers of the computing nodes may be expressed as Node1, Node2, Node3, Node4 and Node5; two tables are expressed as table A and table B respectively; the number Na of sub-tables of the table A is 5, and the serial numbers of sub-tables of the table A may be expressed as A1, A2, A3, A4 and A5; the number Nb of sub-tables of the table B is 6, and the serial numbers of sub-tables of the table B may be expressed as B1, B2, B3, B4, B5 and B6; the method may include the following steps.

Step 301 is that the management node acquires, according to a received request for cross join, the number of sub-tables, the serial numbers of sub-tables, the number of nodes and the serial numbers of nodes, wherein the sub-tables and the nodes are separately included in the table A and the table B which need to perform cross join.

Figure 4:
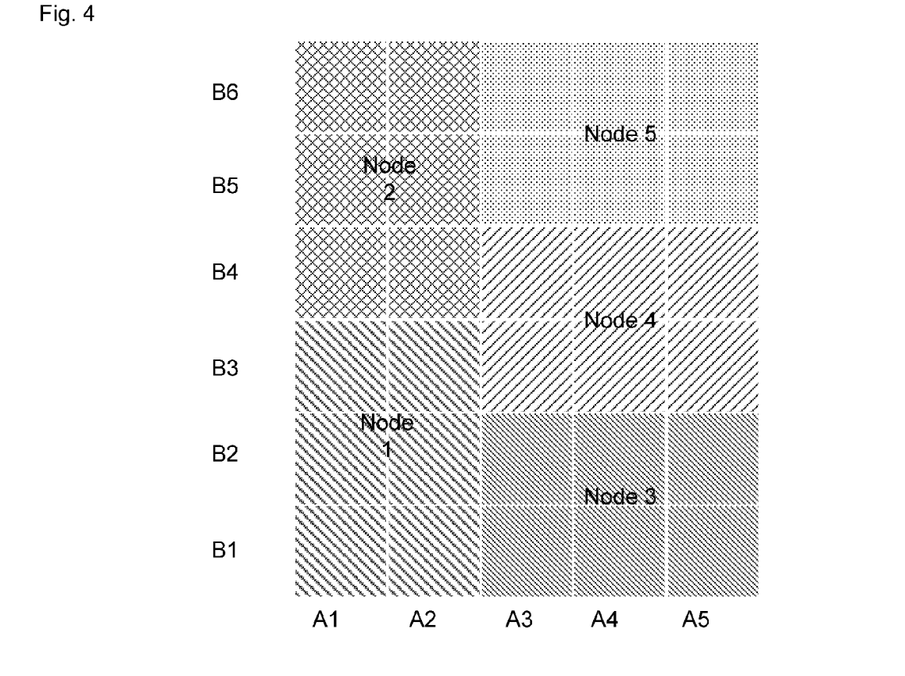
FIG. 4 is a sub-table distribution diagram of a third embodiment of a data distributing method provided by the disclosure.

Step 302 is that the serial numbers of the sub-tables included in the table A or the table B are set in abscissa or ordinate in sequence, as length or width of a big rectangle separately to generate the big rectangle composed of some squares; the number of the squares is a product of the numbers of the sub-tables separately included in the table A and the table B; each square corresponds to the serial numbers of a sub-table of the table A and a sub-table of the table B;

in this embodiment, as shown in FIG. 4, the serial numbers of the sub-tables included in the table A are set in the abscissa in sequence as the length, and the serial numbers of the sub-tables included in the table B are set in the ordinate in sequence as the width, so as to generate a big rectangle composed of 30 squares.

Step 303 is that the big rectangle is divided into two sub-rectangles according to the construction method, wherein the two sub-rectangles are respectively the first sub-rectangle and the second sub-rectangle;

specifically, this step may include the following steps:

step 3031: computing an ideal backup number Ma of subsets of the table A or the table B, wherein the subsets are distributed to all the computing nodes;

here, the total amount of computation of cross join needed to be completed is Na*Nb, and the partial amount of computation of cross join that a computing node can complete is (Ma*Na/Nn)*(Mb*Nb/Nn), and then the product of the partial amount of computation of cross join that a computing node can complete times the number of the computing nodes should be greater than or equal to the total amount of computation of cross join needing to be completed, namely $$(Ma*Na/Nn)*(Mb*Nb/Nn)*Nn \geq Na*Nb, \quad (1)$$

it can be obtained from formula (1) that Ma*Na*Mb*Nb≥Nn*Na*Nb, when the amount of data transmitted is small, Ma*Na*Mb*Nb=Nn*Na*Nb;

Ma*Na+Mb*Nb is the amount of data transmitted, according to mathematical principles, Ma*Na+Mb*Nb≥2√Ma*Mb*Na*Nb, when Ma*Na=Mb*Nb, the amount of data transmitted is minimum, thus, Ma=√Nn*Na/Nb=√5*5/6=2.04 step 3032: according to the Ma obtained by computing, obtaining the evenly division coefficient Xa1*Xb1 of the first sub-rectangle and the evenly division coefficient Xa2*Xb2 of the second sub-rectangle;

specifically, according to an equation set:

$$Xa1*Xb1+Xa2*Xb2=Nn \quad (2)$$

$$Xa1=\text{integer portion of } Ma \quad (3)$$

$$Xa2=Xa1+1 \quad (4)$$

in this embodiment, it is obtained that Xa1=2, Xa2=3, Xb1=1 and Xb21, thus Xa1*Xb1 is 2, and Xa2*Xb2 is 3;

step 3033: according to the obtained Xa1*Xb1 and Xa2*Xb2, computing to obtain a division point Pa of length or width of the big rectangle, wherein the Pa means dividing the big rectangle at which square from left;

specifically, computing to obtain an ideal value of Pa according to formula (5), $$\text{the ideal value of } Pa=Na*(Xa1*Xb1)/(Xa1*Xb1+Xa2*Xb2) \quad (5)$$

in this embodiment, the ideal value of Pa=5*(2)/(2+3)=2, when the ideal value of Pa is an integer, the ideal value of Pa is Pa, and the Pa is 2 in this embodiment;

step 3034: dividing the big rectangle into two sub-rectangles according to the Pa obtained by computing, wherein the two sub-rectangles are the first sub-rectangle and the second sub-rectangle;

in this embodiment, the big rectangle is divided into left and right sub-rectangles at the second square from left.

Step 304 is that according to the obtained Xa1*Xb1 and Xa2*Xb2, the first sub-rectangle and the second sub-rectangle are evenly divided separately;

in this embodiment, the first sub-rectangle is evenly divided according to 2*1, the abscissa of the first sub-rectangle is divided into 1 equal part, and the ordinate of the first sub-rectangle is divided into 2 equal parts, namely the first sub-rectangle is divided into upper and lower rectangles which are the same; the second sub-rectangle is evenly divided according to 3*1, the abscissa of the second sub-rectangle is divided into 1 equal part, and the ordinate of the second sub-rectangle is divided into 3 equal parts, namely the second sub-rectangle is divided into 3 rectangles which are the same. In practice, the first sub-rectangle may also be evenly divided according to 2*1, the abscissa of the first sub-rectangle may also be divided into 2 equal parts, and the ordinate of the first sub-rectangle may also be divided into 1 equal part, namely the first sub-rectangle is divided into left and right rectangles which are the same; the second sub-rectangle may also be evenly divided according to 3*1, the abscissa of the second sub-rectangle may also be divided into 3 equal parts, and the ordinate of the second sub-rectangle may also be divided into 1 equal part, namely the second sub-rectangle is divided into 3 rectangles which are the same.

Step 305 is that the sub-tables corresponding to the squares included in each small rectangle are distributed to the computing nodes corresponding to each small rectangle.

With reference to FIG. 4, the sub-tables A1, A2 of the table A and the sub-tables B1, B2, B3 of the table B are distributed to the Node1; the sub-tables A1, A2 of the table A and the sub-tables B4, B5, B6 of the table B are distributed to the Node2; the sub-tables A3, A4, A5 of the table A and the sub-tables B1, B2 of the table B are distributed to the Node3; the sub-tables A3, A4, A5 of the table A and the sub-tables B3, B4 of the table B are distributed to the Node4; the sub-tables A3, A4, A5 of the table A and the sub-tables B5, B6 of the table B are distributed to the Node5; thus, the embodiment of the disclosure only needs to transmit the data amount of 25 sub-tables;

however, adopting the existing technology needs to distribute the sub-tables A1, B1, B2, B3, B4, B5, B6 to the Node1, distribute the sub-tables A2, B1, B2, B3, B4, B5, B6 to the Node2, distribute the sub-tables A3, B1, B2, B3, B4, B5, B6 to the Node3, distribute the sub-tables A4, B1, B2, B3, B4, B5, B6 to the Node4, and distribute the sub-tables A5, B1, B2, B3, B4, B5, B6 to the Node5; that is, it is needed to transmit the data amount of 35 sub-tables; it can be known by comparing that the embodiment of the disclosure can decrease the amount of data transmitted. When the more the computing nodes to which data is distributed are, and the closer the numbers of the sub-tables of two tables are, the greater the effect of the disclosure is.

The above are only the embodiments of the disclosure, and not intended to limit the scope of the claims of the disclosure.

What is claimed is:

1. A data distributing method, which is applied to a data distributing system comprising several computing nodes and a management node, comprising:
   acquiring, by the management node, serial numbers of sub-tables and serial numbers of nodes according to a received request for cross join;
   wherein the serial numbers of sub-tables and the serial numbers of nodes are separately included in table A and table B which need to perform cross join;
   setting, by the management node, the serial numbers of the sub-tables included in the table A or the table B in abscissa or ordinate in sequence, to form length or width of a big rectangle separately to generate the big rectangle;
   dividing, by the management node, the big rectangle into two sub-rectangles according to a construction method, wherein the two sub-rectangles are respectively a first sub-rectangle and a second sub-rectangle;

evenly dividing, by the management node, the first sub-rectangle and the second sub-rectangle separately to form several small rectangles, wherein each small rectangle corresponds to a serial number of a computing node of the several computing nodes and corresponds to a serial number of a sub-table; and distributing, by the management node, the sub-table corresponding to each small rectangle to the computing node corresponding to each small rectangle;

executing, by each of the several computing nodes, cross join for the distributed sub-table; and saving, by each of the several computing nodes, an execution result in the local hard disk or memory;

wherein dividing, by the management node, the big rectangle into two sub-rectangles according to a construction method comprises:

computing, by the management node, an ideal backup number Ma or Mb of subsets of the table A or the table B, wherein the subsets are distributed to all the computing nodes, wherein Ma represents an ideal backup number of subsets of the table A and Ma is obtained by the formula $Ma=\sqrt{Nn*Na/Nb}$, wherein Na, Nb and Nn are known, Na represents the number of sub-tables of the table A, Nb represents the number of sub-tables of the table B, and Nn represents the number of the computing nodes; Mb represents an ideal backup number of subsets of the table B and Mb is obtained in a similar way as Ma;

according to the Ma or Mb obtained by computing, obtaining, by the management node, an evenly division coefficient Xa1*Xb1 of the first sub-rectangle and an evenly division coefficient Xa2*Xb2 of the second sub-rectangle, wherein Xa1*Xb1 represents an evenly division coefficient of the first sub-rectangle, Xa2*Xb2 represents an evenly division coefficient of the second sub-rectangle;

according to the obtained Xa1*Xb1 and Xa2*Xb2, computing, by the management node, to obtain a division point Pa of the length or width of the big rectangle; and dividing, by the management node, the big rectangle into two sub-rectangles according to the Pa obtained by computing.

2. The method according to claim 1, wherein dividing, by the management node, the big rectangle into two sub-rectangles according to the Pa obtained by computing comprises:

according to the Pa obtained by computing, dividing, by the management node, the big rectangle into two sub-rectangles at a side which is set with more serial numbers of sub-tables.

3. The method according to claim 1, wherein evenly dividing, by the management node, the first sub-rectangle and the second sub-rectangle separately comprises:

according to the obtained Xa1 *Xb1 and Xa2*Xb2, evenly dividing, by the management node, the first sub-rectangle and the second sub-rectangle separately.

4. A data distributing system, comprising:

a management node, comprising a first processor, which is configured to be capable of executing programmed instructions comprising:

according to a received request for cross join, acquiring the number of sub-tables, serial numbers of sub-tables, the number of nodes where the sub-tables are stored and serial numbers of nodes, wherein the sub-tables and the serial numbers of nodes are separately included in table A and table B which need to perform cross join;

setting the serial numbers of the sub-tables included in the table A or the table B in abscissa or ordinate in sequence, to forming length or width of a big rectangle separately to generate the big rectangle;

dividing the big rectangle into two sub-rectangles according to a construction method, wherein the two sub-rectangles are respectively a first sub-rectangle and a second sub-rectangle;

evenly dividing the first sub-rectangle and the second sub-rectangle separately to form several small rectangles, wherein each small rectangle corresponds to a computing node and corresponds to a serial number of a sub-table; and distributing the sub-table corresponding to each small rectangle to the computing node corresponding to each small rectangle;

several computing nodes, each of which comprise a second processor, which is configured to be capable of executing programmed instructions comprising executing cross join for the distributed sub-table; and saving an execution result in the local hard disk or memory;

wherein dividing the big rectangle into two sub-rectangles according to a construction method comprises:

computing an ideal backup number Ma or Mb of subsets of the table A or the table B, wherein the subsets are distributed to all the computing nodes, wherein Ma represents an ideal backup number of subsets of the table A and Ma is obtained by the formula $Ma=\sqrt{Nn*Na/Nb}$, wherein Na, Nb and Nn are known, Na represents the number of sub-tables of the table A, Nb represents the number of sub-tables of the table B, and Nn represents the number of the computing nodes; Mb represents an ideal backup number of subsets of the table B and Mb is obtained in a similar way as Ma;

according to the Ma or Mb obtained by computing through the ideal backup number computing subunit, obtaining an evenly division coefficient Xa1*Xb1 of the first sub-rectangle and an evenly division coefficient Xa2*Xb2 of the second sub-rectangle, wherein Xa1*Xb1 represents an evenly division coefficient of the first sub-rectangle, Xa2*Xb2 represents an evenly division coefficient of the second sub-rectangle;

according to the Xa1*Xb1 and the Xa2*Xb2 obtained by the evenly division coefficient computing subunit, computing to obtain a division point Pa of the length or width of the big rectangle; and according to the Pa obtained by computing through the division point computing subunit, dividing the big rectangle into two sub-rectangles.

5. The management node according to claim 4, wherein dividing the big rectangle into two sub-rectangles according to the Pa obtained by computing comprises: according to the Pa obtained by computing through, dividing the big rectangle into two sub-rectangles at a side which is set with more serial numbers of sub-tables.

6. The management node according to claim 4, wherein evenly dividing the first sub-rectangle and the second sub-rectangle separately comprises: according to the Xa1*Xb1 and the Xa2*Xb2 obtained by the evenly division coefficient computing subunit, evenly dividing the first sub-rectangle and the second sub-rectangle separately.

* * * * *